(12) United States Patent
Li et al.

(10) Patent No.: US 11,873,888 B1
(45) Date of Patent: Jan. 16, 2024

(54) DIFFERENTIAL CARRIER AND RING GEAR ASSEMBLY

(71) Applicant: GM Global Technology Operations LLC, Detroit, MI (US)

(72) Inventors: Huaxin Li, Rochester Hills, MI (US); Debkumar Rakshit, Novi, MI (US); Cheonjae Bahk, Rochester, MI (US); Pankaj Kumar Jha, Troy, MI (US); William John Wilson, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/056,890

(22) Filed: Nov. 18, 2022

(51) Int. Cl.
*F16H 48/38* (2012.01)
*F16H 48/40* (2012.01)

(52) U.S. Cl.
CPC ....... *F16H 48/40* (2013.01); *F16H 2048/382* (2013.01); *F16H 2048/385* (2013.01)

(58) Field of Classification Search
CPC ............... F16H 48/40; F16H 2048/385; F16H 2048/382; B23K 26/02; B23K 26/08; B23K 26/0823; B23K 26/083; B23K 37/047; B23K 2101/006; B23K 2101/008
See application file for complete search history.

(56) References Cited

U.S. PATENT DOCUMENTS

| | | | | |
|---|---|---|---|---|
| 8,845,475 | B2* | 9/2014 | Mayr | F16H 48/24 |
| | | | | 74/606 R |
| 8,876,649 | B2* | 11/2014 | Uchida | F16D 1/0858 |
| | | | | 475/248 |
| 9,476,493 | B2* | 10/2016 | Yanase | F16H 48/40 |
| 9,933,061 | B2* | 4/2018 | Shirakawa | B23K 15/04 |
| 10,539,216 | B2* | 1/2020 | Shirakawa | F16H 48/40 |
| 10,591,040 | B2* | 3/2020 | Yanase | F16H 48/40 |

FOREIGN PATENT DOCUMENTS

JP 2002113622 A * 4/2002 ............ B23P 19/027

* cited by examiner

*Primary Examiner* — Sherry L Estremsky
(74) *Attorney, Agent, or Firm* — Vivacqua Crane PLLC

(57) ABSTRACT

A differential carrier and ring gear assembly for a vehicle is provided. The assembly comprises a differential carrier, a ring gear, and a weld nugget. The differential carrier comprises an outer surface including a first contact face having a weld end extending to a root end. The first contact face has a first slot formed on a first radial portion thereof. The ring gear is disposed about the differential carrier and comprises an inner side having an inner surface. The inner side has a stop flange abutting the root end. The inner surface comprises a second contact face disposed on the first contact face such that the root end is in abutment with the second end. The first and second hollow channels define a pocket therebetween and the first slot defines a first vent hole for venting. The weld nugget is disposed between the first and second contact faces.

13 Claims, 3 Drawing Sheets

DIFFERENTIAL CARRIER AND RING GEAR ASSEMBLY

INTRODUCTION

The present disclosure relates to differential carrier and ring gear assemblies and, more particularly, laser welded differential carrier and ring gear assemblies having enhanced quality welds for enhanced fatigue performance and less cracks.

Differential carrier and ring gear assemblies help transmit engine power to wheel axles of a vehicle and are subject to heavy stress conditions. Heavy stress conditions may include centrifugal stress on a weld, vibrations which generate stress to the weld, and rise to internal temperature, all of which generate bending stresses on the weld. Such conditions may lead to cracks in the weld of an assembly.

SUMMARY

Thus, while current differential carrier and ring gear assemblies achieve their intended purpose, there is a need for a system and method for making a laser welded differential carrier and ring gear assembly having enhanced fatigue performance.

In accordance with one aspect of the present disclosure, a differential carrier and ring gear assembly for a vehicle is provided. The assembly comprises a differential carrier for transmitting engine power. Moreover, the differential carrier comprises an outer side having an outer surface. The outer surface comprises a first contact face having a weld end extending to a root end. The first contact face has a first hollow channel formed circumferentially thereabout. In this aspect, the first contact face has a first slot formed at a first radial portion of the first contact face from the first hollow channel through the root end.

The assembly further comprises a ring gear disposed about the differential carrier. The ring gear comprises an inner side having an inner surface. Moreover, the inner side has a stop flange extending therefrom and abutting the root end of the first contact face. The inner surface comprises a second contact face having a first end extending to a second end at the stop flange. Additionally, the second contact face has a second hollow channel formed circumferentially thereabout.

In this aspect, the second contact face is disposed on the first contact face such that the root end is in abutment with the second end and the stop flange. Moreover, the first and second hollow channels define a pocket therebetween. In addition, the first slot defines a first vent hole in fluid communication with the pocket for venting to the atmosphere during welding.

Furthermore, the assembly further comprises a weld nugget disposed between the first and second contact faces. The weld nugget extends from the weld end to the pocket.

In one embodiment, the first contact face further has a second slot formed on a second radial portion of the first contact face from the first hollow channel through the root end. In another embodiment, first contact face comprises a plurality of slots formed on a plurality of radial portions of the first contact face from the first hollow channel through the root end. In yet another embodiment, the first slot is formed on the first radial portion at one of a decline and an incline relative to a horizontal axis of the differential carrier.

In another embodiment, the first slot is 2 millimeters (mm) to 10 mm wide and 1 mm to 6 mm deep on the first contact face. In still another embodiment, the first slot is 7 mm wide and 2 mm deep on the first contact face. In yet another embodiment, the slot has a shape of one of a semi-circle, a semi-oval, a square, and a rectangle and wherein the slot is a plurality of slots. Each of the plurality of slots being formed on a radial portion of the first contact face from the first hollow channel through the root end.

In accordance with another aspect of the present disclosure, a method of making a laser welded differential carrier and ring gear assembly is provided. In this aspect, the method comprises providing a differential carrier for transmitting engine power. The differential carrier comprises an outer side having an outer surface. Moreover, the outer surface comprises a first contact face defining a first faying surface and having a weld end extending to a root end. The first contact face has a first hollow channel formed circumferentially thereabout. Additionally, the first contact face has a first slot formed on a first radial portion of the first contact face from the first hollow channel through the root end.

The method further comprises providing a ring gear disposed about the differential carrier. In this aspect, the ring gear comprises an inner side having an inner surface. The inner side has a stop flange extending therefrom and abutting the root end of the first contact face. Moreover, the inner surface comprises a second contact face defining a second faying surface and having a first end extending to a second end at the stop flange. In addition, the second contact face has a second hollow channel formed circumferentially thereabout. The second contact face is disposed on the first contact face such that the root end is in abutment with the second end and the stop flange.

In this aspect, the method further comprises arranging the differential carrier and the ring gear such that the first and second faying surfaces are in abutting contact. The first and second hollow channels define a pocket therebetween. Moreover, the first slot defines a first vent hole in fluid communication with the pocket for venting to the atmosphere during welding.

Furthermore, the method further comprises directing a laser beam onto an external surface of the differential carrier effective to form a weld nugget disposed between the first and second contact faces. The weld nugget extends from the weld end to the pocket, thereby allowing ventilation via the first vent hole to the atmosphere to lessen cracking due to stress concentration.

In one example, the first contact face further has a second slot formed on a second radial portion of the first contact face from the first hollow channel through the root end. In another example, the first contact face comprises a plurality of slots formed on a plurality of radial portions of the first contact face from the first hollow channel through the root end. In yet another example, the first slot is formed on the first radial portion at one of a decline and an incline relative to a horizontal axis of the differential carrier.

In one example, the first slot is 2 millimeters (mm) to 10 mm wide across and 1 mm to 6 mm deep on the first contact face. In another example, the first slot is 7 mm wide across and 2 mm deep on the first contact face. In still another example, the slot has a shape of one of a semi-circle, a semi-oval, a square, and a rectangle.

In accordance with another aspect of the present disclosure, a system for making a laser welded differential carrier and ring gear assembly is provided. The system comprises a differential carrier for transmitting engine power. In this aspect, the differential carrier comprises an outer side having an outer surface. The outer surface comprises a first contact face defining a first faying surface and having a weld end extending to a root end. Moreover, the first contact face has a first hollow channel formed circumferentially thereabout.

In this aspect, the system further comprises a ring gear disposed about the differential carrier. The ring gear comprises an inner side having an inner surface. Moreover, the inner side has a stop flange extending therefrom and abutting the root end of the first contact face. The inner surface comprises a second contact face defining a second faying surface and having a first end extending to a second end at the stop flange. Additionally, the second contact face has a second hollow channel formed circumferentially thereabout. The second contact face is disposed on the first contact face such that the root end is in abutment with the second end and the stop flange. Furthermore, one of the first and second contact faces comprises a first slot formed at a first radial portion thereon from one of the first and second hollow channels to one of the root end and the second end.

The system further comprises a stationary unit arranged to hold the differential carrier and ring gear in place for preparation of laser welding. Moreover, the stationary unit has a movable arm arranged to arrange the differential carrier and the ring gear such that the first and second faying surfaces are in abutting contact. The first and second hollow channels define a pocket therebetween. Furthermore, the first slot defines a first vent hole in fluid communication with the pocket for venting to the atmosphere.

Further to this aspect, the system comprises a laser unit arranged to direct a laser beam onto an external surface of the differential carrier effective to form a weld nugget disposed between the first and second contact faces. The weld nugget extends from the weld end to the pocket, thereby allowing ventilation via the first vent hole to the atmosphere to lessen cracking due to stress concentration.

The system further comprises a controller in communication with the stationary unit and the laser unit. The controller is arranged to control the stationary unit and the laser unit. Furthermore, the system comprises a power source arranged to power the controller, the stationary unit and the laser unit.

In one embodiment, one of the first and second contact faces comprises a second slot formed at a second radial portion thereon from one of the first and second hollow channels to one of the root end and the second end. In another embodiment, the first slot is formed on the first radial portion at one of a decline and an incline relative to a horizontal axis of the differential carrier.

In yet another embodiment, the first slot is 2 millimeters (mm) to 10 mm wide across and 1 mm to 6 mm deep on the first contact face. In still another embodiment, the first slot is 7 mm wide across and 2 mm deep on the first contact face. In another embodiment, the slot has a shape of one of a semi-circle, a semi-oval, a square, and a rectangle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Embodiments and examples of the present disclosure describe systems and methods of making a laser welded differential carrier and ring gear assembly having an enhanced quality weld. During welding, gas pressure near the weld may be lessened by way of a slot formed on the assembly defining a vent hole such that vapors may dissipate to the atmosphere. As a result, cracks in the assembly are lessened.

Figure 1:
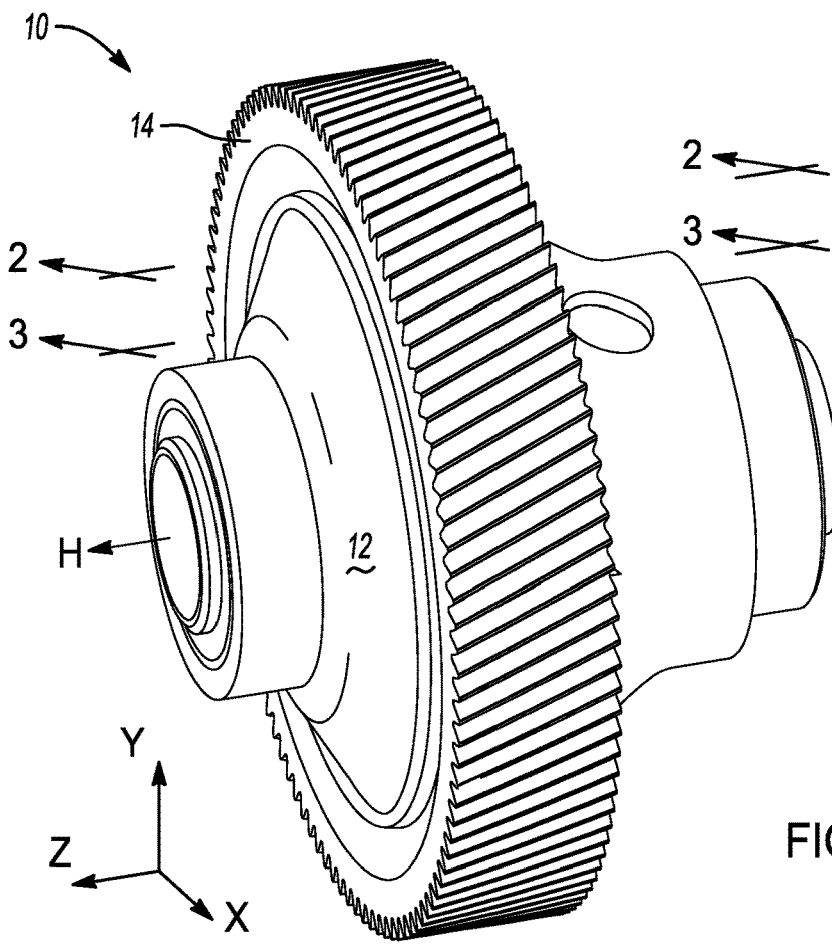
FIG. 1 is a perspective view of a differential carrier and ring gear assembly in accordance with one embodiment of the present disclosure.
Figure 2:
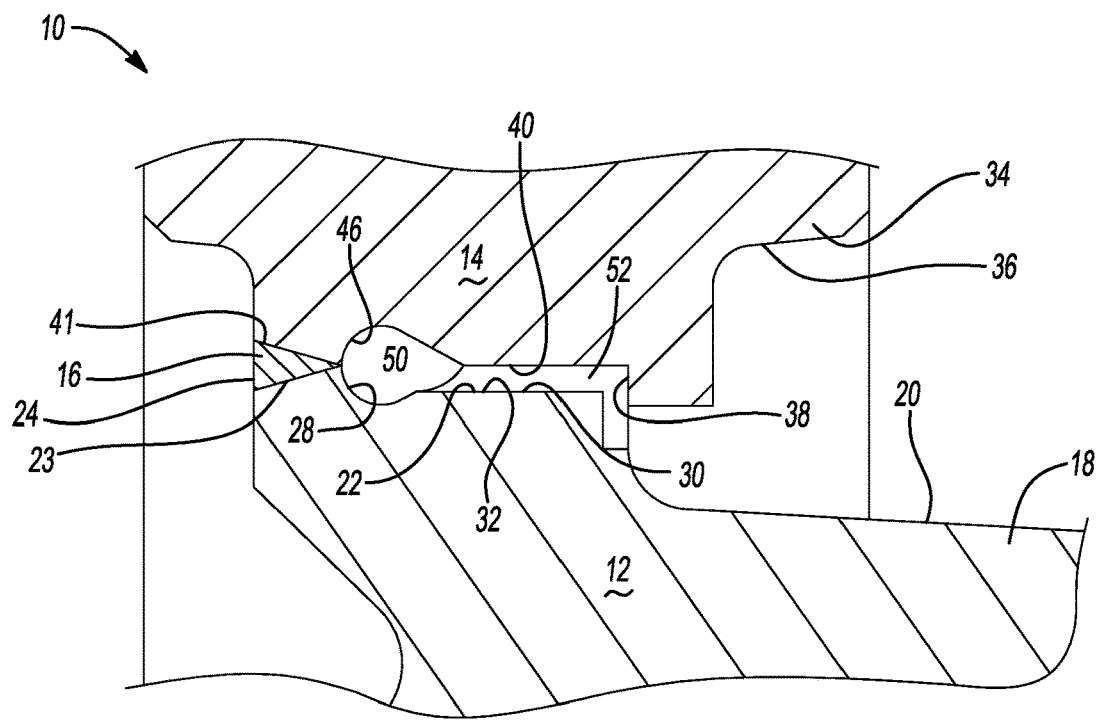
FIG. 2 is a cross-sectional view of the assembly in FIG. 1 taken along lines 2-2.
Figure 3:
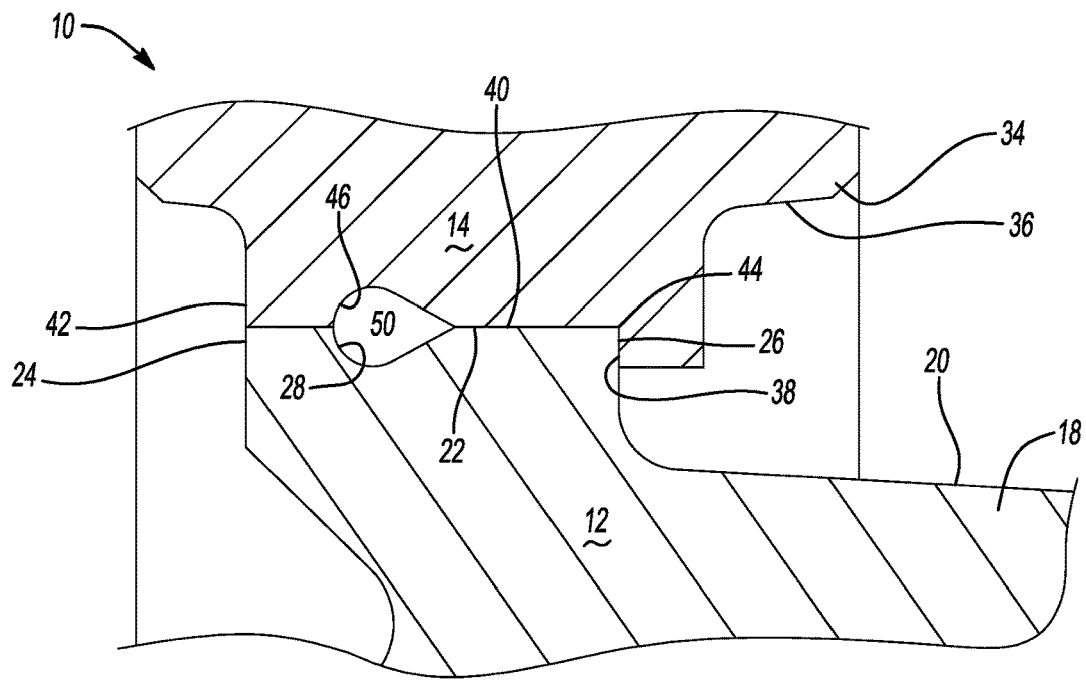
FIG. 3 is a cross-sectional view of the assembly in FIG. 1 taken along lines 3-3.

FIG. 1 illustrates a differential carrier and ring gear assembly 10 for a vehicle in accordance with one embodiment of the present disclosure. As shown, the assembly 10 generally comprises a differential carrier 12 for transmitting engine power, a ring gear 14, and a weld nugget 16. The differential carrier 12 is disposed about a horizontal axis H, defining an x-axis, a y-axis, and a z-axis. Referring to FIGS. 1-3, the differential carrier 12 comprises an outer side 18 having an outer surface 20. The outer surface 20 comprises a first contact face 22 having a weld end 24 extending to a root end 26. Moreover, the first contact face 22 has a first hollow channel 28 formed circumferentially thereabout. That is, the first hollow channel 28 is formed circumferentially on the first contact face 22 about the horizontal axis.

In this embodiment, the first contact face 22 has a first slot 30 formed at a first radial portion 32 on the first contact face 22 from the first hollow channel 28 through the root end 26. The first radial portion 32 may be disposed circumferentially on or along the first contact face 22. In one embodiment, the first slot 30 is formed on the first radial portion 32 at a decline or an incline relative to the horizontal axis of the differential carrier 12.

Moreover, the first slot 30 is 2 millimeters (mm) to 10 mm wide relative to the x-axis and 1 mm to 6 mm deep relative to the y-axis on the first contact face 22. Preferably, the first slot 30 is 7 mm wide relative to the x-axis and 2 mm deep relative to the y-axis on the first contact face 22. Additionally, the slot may take on a shape of a semi-circle, a semi-oval, a square, a rectangle, or any other suitable shape without departing from the spirit or scope of the present disclosure.

Moreover, it is to be understood that the first contact face 22 may further have a second slot (not shown) formed on a second radial portion of the first contact face 22 from the first hollow channel 28 through the root end 26. As with the first radial portion 32, the second radial portion may be disposed circumferentially on or along the first contact face 22. It is further to be understood that the first contact face 22 may comprise a plurality of slots formed on a plurality of radial portions on the first contact face 22 from the first hollow channel 28 through the root end 26. In this embodiment, each of the plurality of radial portions may be disposed circumferentially on or along the first contact face 22.

As shown in FIGS. 1-3, the assembly 10 comprises a ring gear 14 disposed about the differential carrier 12. The ring gear 14 comprises an inner side 34 having an inner surface 36. Moreover, the inner side 34 has a stop flange 38 extending therefrom and is arranged to abut the root end 26 of the first contact face 22 (discussed below). The inner surface 36 comprises a second contact face 40 having a first end 42 extending to a second end 44 at the stop flange 38. Additionally, the second contact face 40 has a second hollow channel 46 formed circumferentially thereabout. That is, the second hollow channel 46 is formed circumferentially on the second contact face 40 about the horizontal axis.

Referring to FIGS. 1-3, the second contact face 40 is disposed on the first contact face 22 such that the root end 26 is in abutment with the second end 44 and the stop flange 38 (see FIG. 3). As shown, the second contact face 40 is disposed on the first contact face 22 such that the first and second hollow channels 28, 46 define a pocket 50 therebetween. In addition, the second contact face 40 is disposed on the first contact face 22 such that the first slot 30 defines a first vent hole 52 in fluid communication with the pocket 50 for venting to the atmosphere during welding (discussed below).

The differential carrier 12 may comprise cast steel, iron, steel alloys, and iron alloys such as grade 60-40-18 ductile iron, grade 60-42-10 ductile iron, grade 65-45-12 ductile iron, grade 70-50-05 ductile iron, grade 80-55-06 ductile iron, grade 80-60-03 ductile iron, and grade 100-70-03 ductile iron as known.

The ring gear 14 may comprise steel and steel alloys some of which are known blends such as 5120, 8620, 4120, 8822, and 4320. Such alloys may be heat treated or cold worked for strength and weldability purposes and particularly for high strength of the weld to maintain. One example of a composition of the ring gear 14 comprise 0.10 weight (wt) percent (%) to 0.30 wt % carbon (C), 0.2 wt % to 2.0 wt % chromium (Cr), Mn 0.2 wt % to 2.0 wt % manganese (Mn), and 0 wt % to 2.50 wt % nickel (Ni).

Furthermore, the assembly 10 comprises a weld nugget 16 disposed between the first and second contact faces 22, 40. As shown, the weld nugget 16 extends from the weld end 24 to the pocket 50. Thus, any residual bi-product gases, e.g., vapors of a rust protection component, emitted during welding will dissipate to the atmosphere since the pocket 50 is in fluid communication with the first vent hole 52 which opens to the atmosphere.

Figure 4:
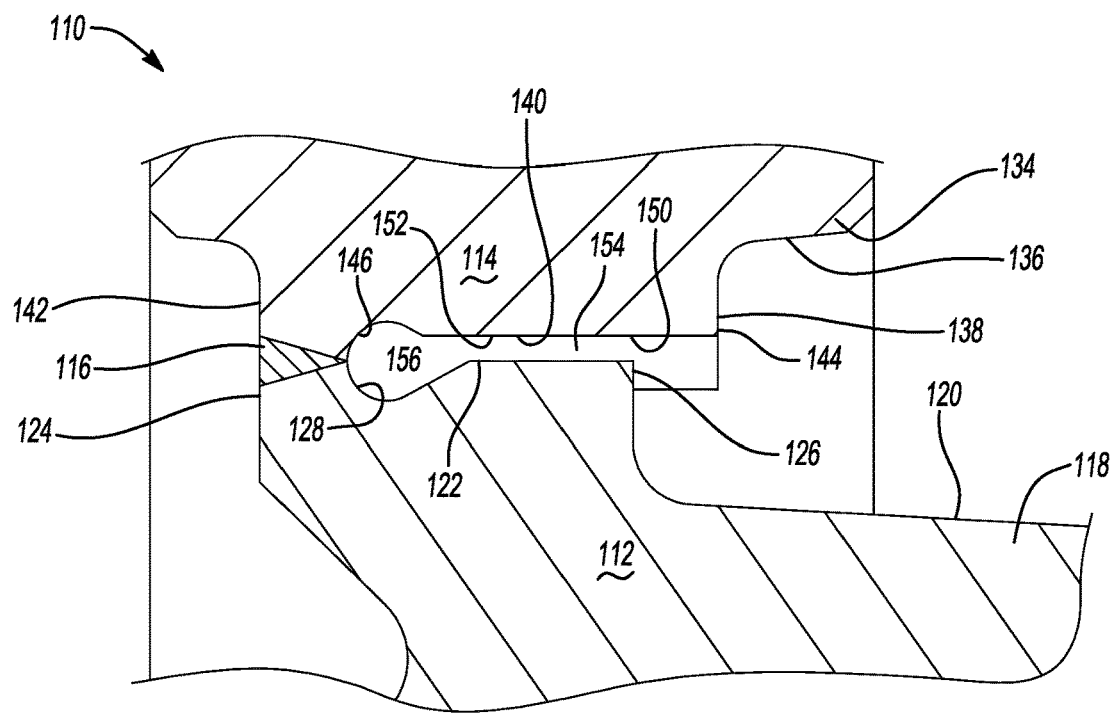
FIG. 4 is a cross-sectional view of another assembly in accordance with another embodiment of the present disclosure.

FIG. 4 illustrates an assembly 110 in accordance with another embodiment of the present disclosure. As shown, the assembly 110 generally comprises a differential carrier 112, a ring gear 114, and a weld nugget 116. As in the previous embodiment, the differential carrier 112 comprises an outer side 118 having an outer surface 120. The outer surface 120 comprises a first contact face 122 having a weld end 124 extending to a root end 126. Moreover, the first contact face 122 has a first hollow channel 128 formed circumferentially thereabout.

As in the previous embodiment, the assembly 110 comprises the ring gear 114 disposed about the differential carrier 112. The ring gear 114 comprises an inner side 134 having an inner surface 136. Moreover, the inner side 134 has a stop flange 138 extending therefrom and abutting the root end 126 of the first contact face 122. The inner surface 136 comprises a second contact face 140 having a first end 142 extending to a second end 144 at the stop flange 138. Additionally, the second contact face 140 has a second hollow channel 146 formed circumferentially thereabout.

Furthermore, the second contact face 140 comprises a first slot 150 formed at a first radial portion 152 thereon from the second hollow channel 146 to the second end 144, defining a first vent hole 154 and a pocket 156. As such, the second contact face 140 is disposed on the first contact face 122 such that the root end 126 is in abutment with the second end 144 and the stop flange 138 defining the first vent hole 154 and the pocket 156.

Figure 5:
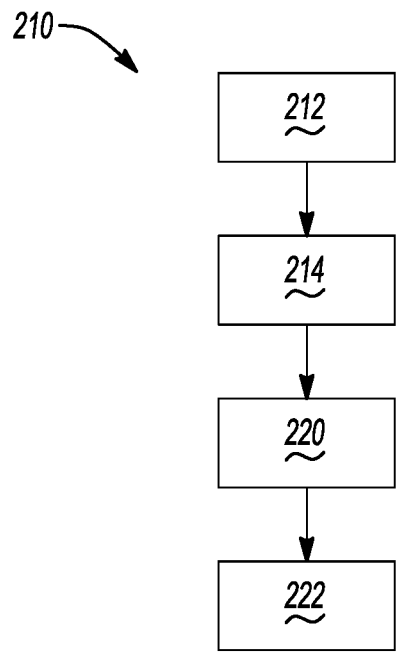
FIG. 5 is a flowchart of a method of laser welding the assembly of FIG. 1 in accordance with one example of the present disclosure.

FIG. 5 depicts a flowchart for a method 210 of making the laser welded differential carrier and ring gear assembly 10 of FIGS. 1-3 in accordance with one example of the present disclosure. In block 212, the method 210 comprises providing a differential carrier 12 for transmitting engine power and circumferentially disposed about a horizontal axis, defining an x-axis, a y-axis, and a z-axis. As discussed, the differential carrier 12 comprises an outer side 18 having an outer surface 20. The outer surface 20 comprises a first contact face 22 defining a first faying surface 23 and having a weld end 24 extending to a root end 26. Moreover, the first contact face 22 has a first hollow channel 28 formed circumferentially thereabout. That is, the first hollow channel 28 is formed circumferentially on the first contact face 22 about the horizontal axis.

As in the previous embodiment, the first contact face 22 has a first slot 30 formed at a first radial portion 32 on the first contact face 22 from the first hollow channel 28 through the root end 26. The first radial portion 32 may be disposed circumferentially on or along the first contact face 22. Preferably, the first slot 30 is formed on the first radial portion 32 at a decline or an incline relative to the horizontal axis of the differential carrier 12.

Moreover, the first slot 30 is 2 millimeters (mm) to 10 mm wide relative to the x-axis and 1 mm to 6 mm deep relative to the y-axis on the first contact face 22. Preferably, the first slot 30 is 7 mm wide relative to the x-axis and 2 mm deep relative to the y-axis on the first contact face 22. Additionally, the slot may take on a shape of a semi-circle, a semi-oval, a square, a rectangle, or any other suitable shape without departing from the spirit or scope of the present disclosure.

Additionally, it is to be understood that the first contact face 22 may further have a second slot (not shown) formed on a second radial portion of the first contact face 22 from the first hollow channel 28 through the root end 26. As with the first radial portion 32, the second radial portion may be disposed circumferentially on or along the first contact face 22. It is further to be understood that the first contact face 22 may comprise a plurality of slots formed on a plurality of radial portions on the first contact face 22 from the first hollow channel 28 through the root end 26. In this embodiment, each of the plurality of radial portions may be disposed circumferentially on or along the first contact face 22.

In block 214, the method 210 further comprises providing a ring gear 14 disposed about the differential carrier 12. In this example, the ring gear 14 comprises an inner side 34 having an inner surface 36. Moreover, the inner side 34 has a stop flange 38 extending therefrom and is arranged to abut the root end 26 of the first contact face 22 (discussed below). The inner surface 36 comprises a second contact face 40 defining a second faying surface 41 and having a first end 42 extending to a second end 44 at the stop flange 38. Additionally, the second contact face 40 has a second hollow channel 46 formed circumferentially thereabout. That is, the second hollow channel 46 is formed circumferentially on the second contact face 40 about the horizontal axis.

As in the previous embodiments, the ring gear 14 may comprise steel and steel alloys some of which are known blends such as 5120, 8620, 4120, 8822, and 4320. Such alloys may be heat treated or cold worked for strength and weldability purposes and particularly for high strength of the weld to maintain. One example, a composition of the ring gear 14 comprises 0.10 weight (wt) percent (%) to 0.30 wt % carbon (C), 0.2 wt % to 2.0 wt % chromium (Cr), Mn 0.2 wt % to 2.0 wt % manganese (Mn), and 0 wt % to 2.50 wt % nickel (Ni).

Further, the differential carrier 12 may comprise cast steel, iron, steel alloys, and iron alloys such as grade 60-40-18 ductile iron, grade 60-42-10 ductile iron, grade 65-45-12 ductile iron, grade 70-50-05 ductile iron, grade 80-55-06 ductile iron, grade 80-60-03 ductile iron, and grade 100-70-03 ductile iron as known.

In block 220, the method 210 further comprises arranging the differential carrier 12 and the ring gear 14 such that the first and second faying surfaces 23, 41 are in abutting contact. That is, the second contact face 40 is disposed on the first contact face 22 such that the root end 26 is in abutment with the second end 44 and the stop flange 38 (see FIG. 3). Moreover, the second contact face 40 is disposed on the first contact face 22 such that the first and second hollow channels 28, 46 define a pocket 50 therebetween. In addition, the second contact face 40 is disposed on the first contact face 22 such that the first slot 30 defines a first vent hole 52 in fluid communication with the pocket 50 for venting to the atmosphere during welding (discussed below).

In block 222, the method 210 further comprises directing a laser beam onto an external surface of the differential carrier 12 effective to form a weld nugget 16 disposed between the first and second contact faces 22, 40. In this example, the weld nugget 16 extends from the weld end 24 to the pocket 50. The pocket 50 is in fluid communication with the first vent hole 52 which opens to the atmosphere. Thus, a resulting bi-product gas, e.g., vapors of a rust protection component, emitted during welding will dissipate to the atmosphere by way of the pocket 50 and the first vent hole 52. As a result, cracking due to stress concentration is lessened.

Figure 6:
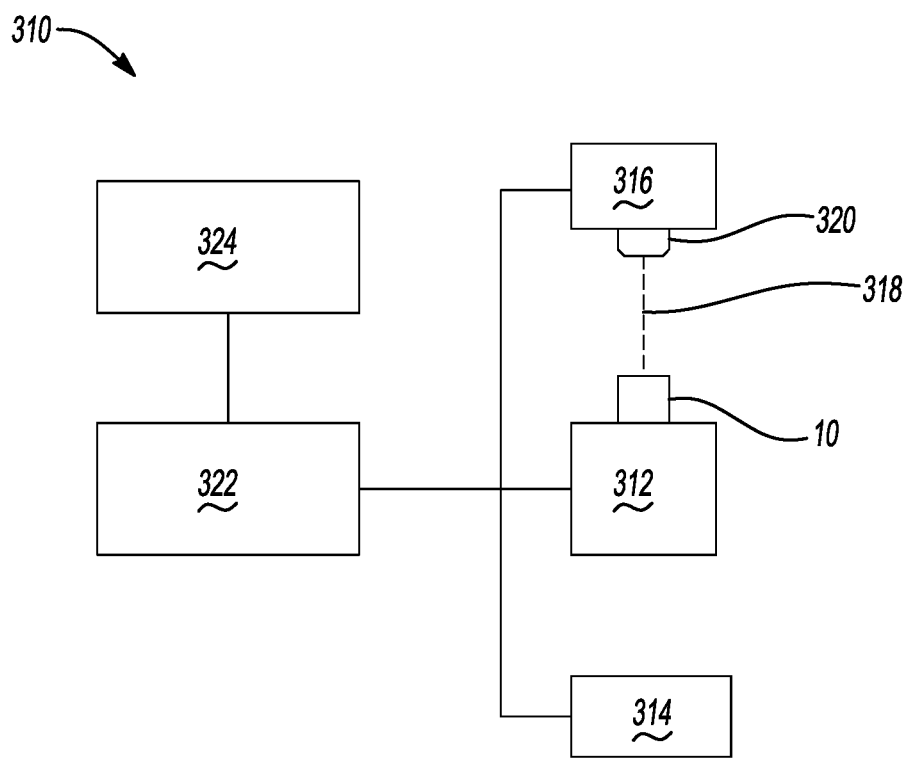
FIG. 6 is a schematic view of a system for laser welding the assembly of FIG. 1 by way of the method of FIG. 5 in accordance with one embodiment of the present disclosure.

FIG. 6 illustrates a schematic view of a system 310 for making a laser welded differential carrier and ring gear assembly 10 of FIGS. 1-3 implementing the method 210 of FIG. 5 in accordance with another embodiment of the present disclosure. The system 310 comprises the differential carrier 12 and the ring gear 14 for transmitting engine power discussed in the previous embodiments and examples above. As discussed, the differential carrier 12 comprises an outer side 18 having an outer surface 20. The outer surface 20 comprises a first contact face 22 defining a first faying surface 23 and having a weld end 24 extending to a root end 26. Moreover, the first contact face 22 has a first hollow channel 28 formed circumferentially thereabout.

As mentioned, the ring gear 14 is disposed about the differential carrier 12. The ring gear 14 comprises an inner side 34 having an inner surface 36. Moreover, the inner side 34 has a stop flange 38 extending therefrom and abutting the root end 26 of the first contact face 22. The inner surface 36 comprises a second contact face 40 defining a second faying surface 41 and having a first end 42 extending to a second end 44 at the stop flange 38. Additionally, the second contact face 40 has a second hollow channel 46 formed circumferentially thereabout. The second contact face 40 is disposed on the first contact face 22 such that the root end 26 is in abutment with the second end 44 and the stop flange 38.

Furthermore, one of the first and second contact faces 22, 40 comprises a first slot 30 formed at a first radial portion 32 thereon from one of the first and second hollow channels 28, 46 to one of the root end 26 and the second end 44.

As shown in FIG. 6, the system 310 further comprises a stationary unit 312 arranged to hold the differential carrier 12 and ring gear 14 in place for preparation of laser welding. Moreover, the stationary unit has a movable arm arranged to arrange the differential carrier 12 and the ring gear 14 such that the first and second faying surfaces 23, 41 are in abutting contact. The first and second hollow channels 28, 46 define a pocket 50 therebetween. Furthermore, the first slot 30 defines a first vent hole 52 in fluid communication with the pocket 50 for venting to the atmosphere.

The stationary unit 312 may be any suitable stationary table equipped to receive and hold the differential carrier 12 and the ring gear 14 in place for preparation of laser welding. It is to be understood that the movable arm 314 or any other suitable movable unit may be used with the stationary unit to arrange the differential carrier 12 and the ring gear 14 such that the first and second faying surfaces 23, 41 are in abutting contact.

Moreover, the system 310 further comprises a laser unit 316 to direct a laser beam 318 onto an external surface of the differential carrier 12 effective to form a weld nugget 16 disposed between the first and second contact faces 22, 40. The weld nugget 16 extends from the weld end 24 to the pocket 50, thereby allowing ventilation via the first vent hole 52 to the atmosphere to lessen cracking due to stress concentration. The laser unit 316 may include a laser tool 320 arranged to emit a laser beam on the external surface of the differential carrier 12 or the ring gear 14 to effectively form the weld nugget 16 disposed between the first contact face 22 of the differential carrier 12 and the second contact face 40 of the ring gear 14.

The laser beam may be a single beam laser from a fiber laser source. In one example, the power output of the laser beam may be 1 KW to 12 KW, and preferably 2-6 KW. The laser beam may have a welding speed of 0.5 m/min to 6 m/min, and preferably 1-3 m/min. Moreover, the laser beam may have a spot size of 100 micron to 600 micron, a focal position at −6 to +6 mm with preferably argon gas shielding.

In another example, laser welding may be accomplished by way of electron beam welding having power sets at 600 J/cm to 800 J/cm, a welding speed of 1.0 m/min to 3.0 m/min with an electron beam spot at 0.2 mm to 0.4 mm in size. Other laser welding methods and systems may be used, such as fusion welding, without departing from the spirit or scope of the present disclosure. Additionally, the weld may have a depth to width ratio of 2 to 3.

Referring to FIG. 6, the system 310 further comprises a controller 322 in communication with the stationary unit 312, the movable arm 314, and the laser unit 316. The controller 42 is configured to control the stationary unit 312, the movable arm 314, and the laser unit 316. Moreover, the system 310 comprises a power source 324 configured to power controller 322, the stationary unit 312, the movable arm 314, and the laser unit 316.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of making a laser welded differential carrier and ring gear assembly, the method comprising:

providing a differential carrier for transmitting engine power, the differential carrier comprising an outer side having an outer surface, the outer surface comprising a first contact face defining a first faying surface and having a weld end extending to a root end, the first contact face having a first hollow channel formed circumferentially thereabout, the first contact face having a first slot formed on a first radial portion of the first contact face from the first hollow channel through the root end;

providing a ring gear disposed about the differential carrier, the ring gear comprising an inner side having an inner surface, the inner side having a stop flange extending therefrom and abutting the root end of the first contact face, the inner surface comprising a second contact face defining a second faying surface and having a first end extending to a second end at the stop flange, the second contact face having a second hollow channel formed circumferentially thereabout, the second contact face disposed on the first contact face such that the root end is in abutment with the second end and the stop flange;

providing a stationary unit arranged to hold the differential carrier and ring gear in place for preparation of laser welding, the stationary unit having a movable arm arranged to arrange the differential carrier and the ring gear such that the first and second faying surfaces are in abutting contact, the first and second hollow channels defining a pocket therebetween, the first slot defining a first vent hole in fluid communication with the pocket for venting to atmosphere;

providing a laser unit arranged to direct a laser beam onto an external surface of the differential carrier effective to form a weld nugget disposed between the first and second contact faces;

providing a controller in communication with the stationary unit and the laser unit, the controller arranged to control the stationary unit and the laser unit; and providing a power source arranged to power the controller, the stationary unit and the laser unit arranging the differential carrier and the ring gear such that the first and second faying surfaces are in abutting contact, the first and second hollow channels defining a pocket therebetween, the first slot defining a first vent hole in fluid communication with the pocket for venting; and directing the laser beam onto an external surface of the differential carrier effective to form the weld nugget disposed between the first and second contact faces, the weld nugget extending from the weld end to the pocket, thereby allowing ventilation via the first vent hole to atmosphere to lessen cracking due to stress concentration.

2. The method of claim 1 wherein the first contact face further has a second slot formed on a second radial portion of the first contact face from the first hollow channel through the root end.

3. The method of claim 1 wherein the first contact face comprises a plurality of slots formed on a plurality of radial portions of the first contact face from the first hollow channel through the root end.

4. The method of claim 1 wherein the first slot is formed on the first radial portion at one of a decline and an incline relative to a horizontal axis of the differential carrier.

5. The method of claim 1 wherein the first slot is 2 millimeters (mm) to 10 mm wide across and 1 mm to 6 mm deep on the first contact face.

6. The method of claim 1 wherein the first vent hole is 7 mm wide across and 2 mm deep on the first contact face.

7. The method of claim 1 wherein the slot has a shape of one of a semi-circle, a semi-oval, a square, and a rectangle.

8. A system for making a laser welded differential carrier and ring gear assembly, the system comprising:

a differential carrier for transmitting engine power, the differential carrier comprising an outer side having an outer surface, the outer surface comprising a first contact face defining a first faying surface and having a weld end extending to a root end, the first contact face having a first hollow channel formed circumferentially thereabout;

a ring gear disposed about the differential carrier, the ring gear comprising an inner side having an inner surface, the inner side having a stop flange extending therefrom and abutting the root end of the first contact face, the inner surface comprising a second contact face defining a second faying surface and having a first end extending to a second end at the stop flange, the second contact face having a second hollow channel formed circumferentially thereabout, the second contact face disposed on the first contact face such that the root end is in abutment with the second end and the stop flange, wherein one of the first and second contact faces comprises a first slot formed at a first radial portion thereon from one of the first and second hollow channels to one of the root end and the second end;

a stationary unit arranged to hold the differential carrier and ring gear in place for preparation of laser welding, the stationary unit having a movable arm arranged to arrange the differential carrier and the ring gear such that the first and second faying surfaces are in abutting contact, the first and second hollow channels defining a pocket therebetween, the first slot defining a first vent hole in fluid communication with the pocket for venting to atmosphere;

a laser unit arranged to direct a laser beam onto an external surface of the differential carrier effective to form a weld nugget disposed between the first and second contact faces, the weld nugget extending from the weld end to the pocket, thereby allowing ventilation via the first vent hole to atmosphere to lessen cracking due to stress concentration;

a controller in communication with the stationary unit and the laser unit, the controller arranged to control the stationary unit and the laser unit; and a power source arranged to power the controller, the stationary unit and the laser unit.

9. The system of claim 8 wherein one of the first and second contact faces comprises a second slot formed at a first radial portion thereon from one of the first and second hollow channels to one of the root end and the second.

10. The system of claim 8 wherein the first slot is formed on the first radial portion at one of a decline and an incline relative to a horizontal axis of the differential carrier.

11. The system of claim 8 wherein the first slot is 2 millimeters (mm) to 10 mm wide across and 1 mm to 6 mm deep on the first contact face.

12. The system of claim 8 wherein the first vent hole is 7 mm wide across and 2 mm deep on the first contact face.

13. The system of claim 8 wherein the slot has a shape of one of a semi-circle, a semi-oval, a square, and a rectangle.

* * * * *